Nov. 16, 1948. G. MELLING 2,453,999
HANDLE BAR TRACTOR WHEEL DRIVE CONTROL
Filed Dec. 29, 1945
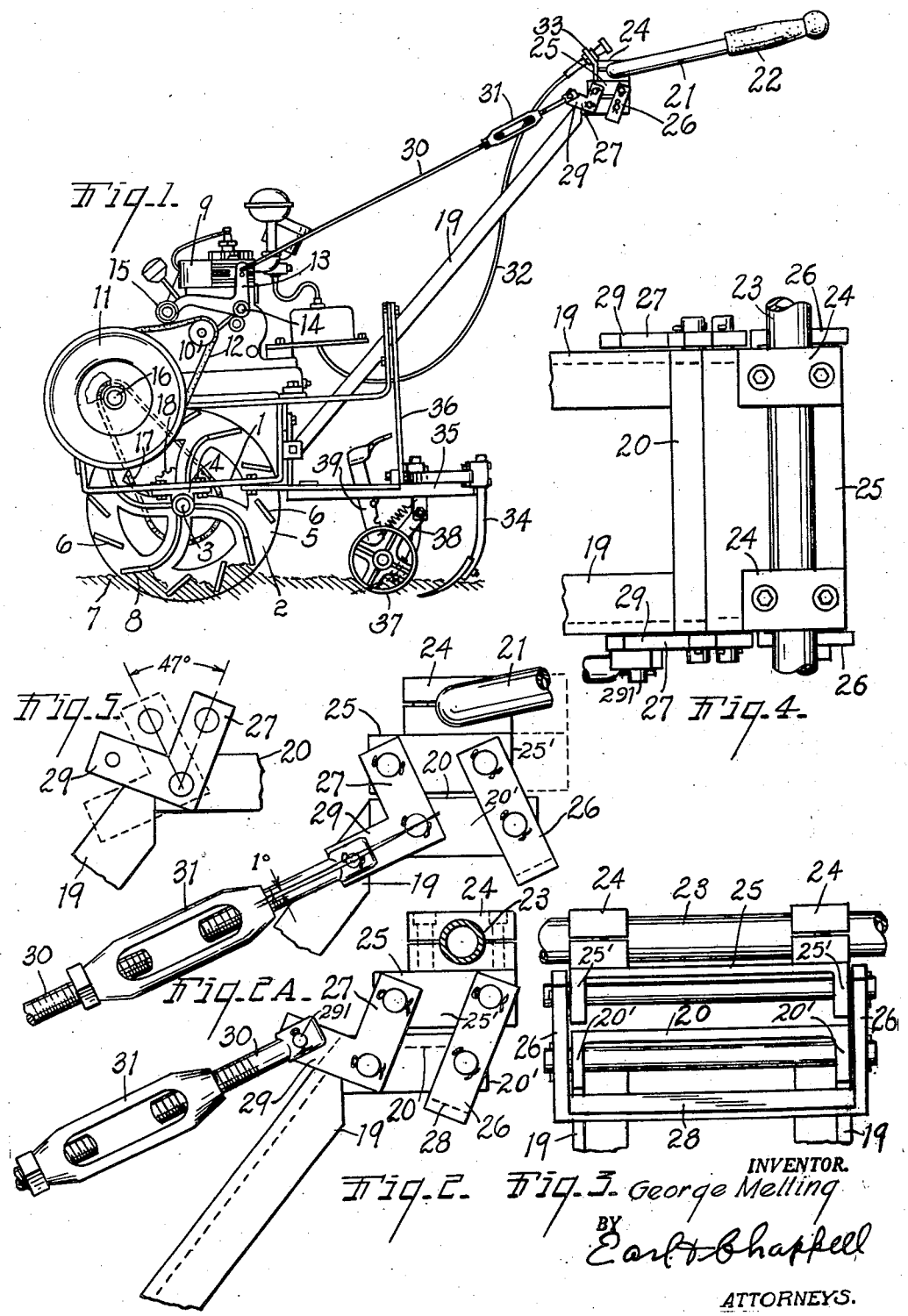
INVENTOR.
George Melling
BY Earl F. Chappell
ATTORNEYS.

Patented Nov. 16, 1948

2,453,999

UNITED STATES PATENT OFFICE 2,453,999

HANDLE BAR TRACTOR WHEEL DRIVE CONTROL

George Melling, Jackson, Mich.

Application December 29, 1945, Serial No. 638,236

15 Claims. (Cl. 180—19)

This invention relates to improvements in handle bar tractor wheel drive control.

The main objects of this invention are:

First, to provide a tractor manually guided ground working implement which is easily guided and controlled.

Second, to provide a powered implement which may be stopped merely by a backward pull on the steering handle bars.

Third, to provide a structure having these advantages in which the parts are strong and rigid and at the same time moderate in weight.

Objects pertaining to details and economies of the invention will appear from the description to follow. The invention is defined in the claims.

A structure embodying the features of the invention is clearly ilustrated in the accompanying drawing, in which:

Fig. 1 is a side elevation of a ground working implement embodying my invention with the the driving control mechanism in released position.

Fig. 2 is a fragmentary view of parts of the steering and control mechanism in the position shown in Fig. 1.

Fig. 2A is an enlarged fragmentary view of the same parts in driving position.

Fig. 3 is an enlarged fragmentary rear elevation of parts shown in Figs. 2 and 2A.

Fig. 4 is an enlarged fragmentary plan view of parts of the control mechanism.

Fig. 5 is an enlarged fragmentary view with parts shown in control release position by full lines and in engaging position by dotted lines.

The embodiment of the invention illustrated is a single wheel tractor ground working implement and comprises a frame designated generally by the numeral 1, a traction wheel 2 being provided with an axle 3 supported in the bearing box 4 on the frame. This traction wheel comprises a central web 5 having treads 6 disposed on both sides thereof, these treads being arranged so that they engage the soil indicated at 7 in an approximately horizontal position as indicated at 8 in Fig. 1, thus providing an effective traction engagement of the wheel with the soil.

The motor 9 is mounted on the frame and has driving connection to the axle 3, this driving connection including a pulley 10 on the shaft of the engine and the pulley 11 connected to the pulley 10 by the belt 12. The belt tightener lever 13 is pivoted at 14 and provided with an idler 15 coacting with the belt 12. The shaft 16 of the pulley 11 is provided with a sprocket wheel connected by the sprocket chain 17 to the sprocket 18 on the axle 3.

The frame is provided with a pair of rearwardly projecting steering posts 19 connected at their rear ends by the cross piece 20. The U-shaped handle bar 21 is provided with grips 22. Only one arm of the handle bar is illustrated but it will be understood that the other is a duplicate. The bight 23 of the handle bar is connected by the clamps 24 to the handle bar cross piece 25. These clamps permit the vertical adjustment of the handle bar to accommodate the particular operator, that is, to adjust to operators of different height. The cross piece 25 is shiftably connected to the cross piece 20 of the steering posts by means of pairs of parallel links 26 and 27 so that the handle bar is supported for a forward and backward shifting movement. The links 26 and 27 are pivotally connected to the downwardly projecting portions 20' and 25' of the cross pieces 20 and 25, respectively. The links 26 project below the steering post cross piece 20 and are connected by the cross piece 28 which not only braces the links but constitutes a stop member coacting with the under side of the steering post cross piece 20. The cross piece also keeps the links in parallelism, that is, it prevents thrust on the grips from twisting the links, and such thrust of necessity results from the steering manipulation. It also might accidentally be imparted. The front links 27 are provided with projecting arms 29 to one of which the control rod 30 is pivotally connected at 291, this control rod engaging the upwardly projecting arm of the belt tightener lever 13. The control rod is preferably provided with a turn buckle adjusting member 31. This connection for the control lever to the handle bar provides a locking toggle movable across dead center as shown by broken lines at 1° in Fig. 2A to hold the control rod or the control member actuated thereby in locked position. However, a slight rearward pull releases the toggle. This is an important feature in ease of operation. With the parts thus arranged a rearward pull on the handle bars shifts the handle bar cross piece rearwardly and lifts the belt tightener idler from the belt, thus releasing the driving connection.

The cross piece 28 for the links 26, which as stated constitutes a stop, engages the under side of the cross piece on the steering posts and thereby stops the machine. A forward push on the handle bar engages the driving connection and starts the machine. This shiftable connection for the handle bars to the steering posts is such that the machine may be steered and manipulated from the handle bars.

The engine or motor is controlled from the remote control rod designated generally by the numeral 32, the rear end of which is mounted on the bracket 33 on the cross piece 25 of the handle bar. The implement illustrated has ground working shovels 34, the draw bar 35 being pivotally mounted on the frame and suspended for swinging movement by the link 36. A ground wheel 37 is provided which is carried by the swinging arm 38 adjustably supported by the link 39. However, these particular details form no part of this invention.

My steering and control mechanism is strong and rigid and is capable of withstanding such strains as it may be subjected to although relatively light in weight, the parts being disposed so that full advantage of the material is availed of. To stop the implement it is merely necessary to pull rearwardly on the handle bars and such movement is a natural reaction to the desire to stop the implement. A forward push on the handle bars is also a natural movement.

I have illustrated and described my invention in a highly practical embodiment thereof. I have not attempted to illustrate or describe certain modifications and adaptations as it is believed this disclosure will enable those skilled in the art to embody or adapt my invention as may be desired.

Having thus described the invention what I claim as new and desire to secure by Letters Patent is:

1. The combination in a tractor implement comprising a frame, a traction wheel, a motor and driving connections for the motor to the traction wheel including a belt and coacting belt tightener unit, of steering posts extending rearwardly from the frame, a cross piece on the rear ends of said steering posts, a U-shaped handle bar, a cross bar to which the bight of said handle bar is fixedly connected, pairs of parallel links pivotally mounted on said cross piece and pivotally connected to said cross bar, the rear links being extended below the cross piece and provided with a connecting stop member coacting with the cross piece to limit the rearward movement of the handle bar, one of the front pair of links being provided with an arm, and an adjustable link connecting said arm to said belt tightener unit.

2. The combination in a tractor implement comprising a frame, a traction wheel, a motor and driving connections for the motor to the traction wheel including a belt and coacting belt tightener unit, of a steering post extending rearwardly from the frame, a cross piece on the rear end of said steering post, a handle bar, pairs of parallel links pivotally mounted on said cross piece and connected to said handle bar, one pair of links being extended below the cross piece and provided with a stop member coacting with the cross piece to limit the rearward movement of the handle bar, one of the links of said pairs of parallel links being provided with an arm, and a link connecting said arm to said belt tightener unit.

3. A control for a tractor implement including a frame provided with a rearwardly projecting steering post having a cross piece at its rear end, a traction wheel, a motor, a driving connection therefor to said traction wheel including a control element, a handle bar provided with a cross bar, pairs of parallel links pivotally connected to said steering post cross bar and to said handle bar cross bar, one of said links of said pairs of parallel links being provided with a stop coacting with the steering post cross bar for limiting the rearward movement of the handle bar and to sustain rearward pull thereon when the handle bar is in its rearward position, one of the links of said pairs of parallel links being provided with an arm, and a control rod connecting said driving control element to said arm.

4. A control for a tractor implement including a frame provided with a steering post, a traction wheel, a motor, driving connections therefor to said traction wheel including a control element, a handle bar, pairs of parallel links pivotally connected to said steering post and to said handle bar, one of said links of said pairs of parallel links being provided with a stop limiting the rearward movement of the handle bar, and a control rod connecting said driving control element to one of said links of said pairs of parallel links.

5. The combination in a tractor implement comprising a frame, a traction wheel, a motor, and driving connections for the motor to the traction wheel including a belt and coacting belt tightener unit, of a steering post on said frame, a handle bar shiftably mounted on said steering post for forward and backward movement, said handle bar including spaced hand grips and a member supportingly connecting said hand grips and disposed transversely said post adjacent the top thereof, means including an adjustable link connecting said handle bar to said belt tightener unit and a stop limiting backward movement of said handle bar relative to said post.

6. The combination in a tractor implement comprising a frame, a traction wheel, a motor, and driving connections for the motor to the traction wheel including a belt and coacting belt tightener unit, of a steering post on said frame, a handle bar shiftably mounted on said steering post for forward and backward movement relative to said post, said handle bar including laterally spaced hand grips and including a member disposed transversely said post adjacent the top thereof, means adjustably supporting said transverse member on the post to permit the handle bar to be pivotally adjusted to different heights, and an operating connection for said handle bar to said belt tightener unit.

7. A control for a tractor implement including a frame provided with a steering post, a traction wheel and a motor, a driving connection for said motor to said traction wheel including a control element, a handle bar mounted on said steering post for limited shifting movement from front to rear, said handle bar including a U-shaped member having the bight thereof disposed transversely of the upper end of the post and connected thereto, and a control rod connecting said driving control element to said handle bar whereby the control element is actuated to engaged position by the forward movement of the handle bar and to disengaged position by the rearward movement thereof.

8. A control for a tractor implement including a frame provided with a steering post, a traction wheel and a motor, a driving connection for said motor to said traction wheel including a driving control element, a handle bar shiftably mounted on said steering post for movement from front to rear relative to said post, said handle bar including laterally spaced hand grips and including a member disposed transversely said post adjacent the top thereof, means adjustably supporting said transverse member on the post to permit the handle bar to be pivotally adjusted to different heights, and an operating connection for said handle bar to said control element whereby the control element is actuated to engaged position by the forward movement of the handle bar and to disengaged position by the rearward movement thereof.

9. A control for a tractor including a frame provided with a rearwardly projecting steering post having a cross piece at its rear end, a traction wheel, a motor, and driving connections for the motor to the traction wheel including a belt, a pivotally mounted belt tightener lever, a handle bar provided with a cross bar, pairs of parallel links pivotally connected to said steering post cross bar and to said handle bar, one of said pairs of links being connected by a cross member which coacts with the cross piece on the post to provide a stop limiting the rearward movement of the handle bar, one of the links of said pairs of parallel links being provided with an arm, and a control rod connecting said arm to said belt tightener lever, the arm on said link being positioned relative to the pivot of the link to coact with the control rod in providing a locking toggle for the belt tightener lever when the handle bar is actuated to its forward position.

10. The combination in a tractor, of a traction wheel, a motor, driving connections for the motor to the traction wheel, means for controlling said driving connections, a steering post having a cross piece at its rear end, a handle bar provided with a cross bar, pairs of parallel links pivotally connected to said steering post cross bar and to said handle bar, one of said links of said pairs of parallel links being connected by the cross member which coacts with the cross piece on the post to provide a stop limiting the movement of the handle bar in one direction and to maintain the links in alined relation, and a control rod connecting one of said links of said pairs of parallel links to said control means whereby the driving connections for the motor are controlled by the shifting movement of the handle bar.

11. The combination in a tractor, of a traction wheel, a motor, driving connections for the motor to the traction wheel, means for controlling said driving connections, a steering post having a cross piece at its rear end, a handle bar provided with a cross bar, pairs of parallel links pivotally connected to said steering post cross bar and to said handle bar, and a control rod connecting one of said links of said pairs of parallel links to said control member whereby the driving connections for the motor are controlled by the shifting movement of the handle bar.

12. A control for a tractor including a frame provided with a rearwardly projecting steering post, a traction wheel, a motor, and driving connections for the motor to the traction wheel including a belt, a pivotally mounted belt tightener lever, a handle bar mounted on said post for limited movement relative to the post forward in the direction of the pull of the tractor and rearward in a direction opposite to said pull, said handle bar being manually engageable for steering the tractor, a pivoted arm operatively associated with said handle bar for actuation by the shifting of said handle bar, and a control rod connecting said arm to said belt tightener lever, said arm being positioned to coact with the control rod in providing a locking toggle for the belt tightener lever when the hande bar is actuated to its forward position.

13. A control for a tractor including a frame provided with a rearwardly projecting steering post having a cross piece at its rear end, a traction wheel, a motor, and driving connections for the motor to the traction wheel, a control member for said driving connections, a handle bar provided with a cross bar, pairs of parallel links pivotally connected to said steering post cross bar and to said handle bar, one of said pairs of links being connected by a cross member which coacts with the cross piece on the post to provide a stop limiting the rearward movement of the handle bar, one of the links of said pairs of parallel links being provided with an arm, and a control rod connecting said arm to said control member, the arm on said link being positioned relative to the pivot of the link to coact with the control rod in providing a locking toggle for the control member when the handle bar is actuated to its forward position.

14. A control for a tractor implement including a frame, a driving means, a control element for said driving means, a handle bar shiftably mounted relative to said frame forward in the direction of the pull of the tractor and rearward in a direction opposite to the pull of the tractor, said handle bar being manually engageable for steering the tractor, and means for actuating the control element to actuated position on the forward shifting of the handle bar, said means constituting a locking toggle for holding the control element in actuated position while the hande bar remains in its forward position, the toggle being broken and the control element retracted when the handle bar is moved rearwardly.

15. A control for a tractor including a frame provided with a steering post, a traction wheel, a motor, driving connections for the motor to the traction wheel, control means for engaging and disengaging said driving connections, a handle bar mounted on said steering post for limited forward and backward shifting movement relative to the post, said handle bar being manually engageable for steering the tractor, and operating connections from said handle bar to said driving control means including a control rod and an arm actuated by the shifting of said handle bar, said arm and control rod coacting to provide a locking toggle for the driving control means when the handle bar is actuated to its forward position.

GEORGE MELLING.

REFERENCES CITED

The following references are of record in the file of this patent:

UNITED STATES PATENTS

| Number | Name | Date |
| --- | --- | --- |
| 2,138,239 | Irgens | Nov. 29, 1938 |
| 2,257,796 | Heineke | Oct. 7, 1941 |
| 2,367,466 | Loy | Jan. 16, 1945 |

FOREIGN PATENTS

| Number | Country | Date |
| --- | --- | --- |
| 329,825 | Great Britain | May 29, 1930 |